(12) United States Patent
Yip

(10) Patent No.: US 7,263,334 B2
(45) Date of Patent: Aug. 28, 2007

(54) DIRECTIONAL COUPLER FOR USE IN VCO UNEQUAL POWER SPLITTING

(75) Inventor: ChiFai Yip, San Marcos, CA (US)

(73) Assignee: Nokia Corporation, Espoo (FI)

( * ) Notice: Subject to any disclaimer, the term of this patent is extended or adjusted under 35 U.S.C. 154(b) by 383 days.

(21) Appl. No.: 10/698,132

(22) Filed: Oct. 31, 2003

(65) Prior Publication Data
US 2005/0095990 A1    May 5, 2005

(51) Int. Cl.
H04B 1/38    (2006.01)

(52) U.S. Cl. ............... 455/73; 455/86; 455/76; 330/51; 330/53

(58) Field of Classification Search ........... 455/73, 455/86, 76, 78; 330/51, 53
See application file for complete search history.

(56) References Cited

U.S. PATENT DOCUMENTS

| | | | | |
|---|---|---|---|---|
| 5,483,679 A | * | 1/1996 | Sasaki | ......... 455/86 |
| 6,215,988 B1 | | 4/2001 | Matero | ........ 455/188.1 |
| 6,362,685 B1 | * | 3/2002 | Vagher | ......... 330/124 R |

OTHER PUBLICATIONS

Wolff et al ; "Microwave Engineering and Systems Application", 1988, John Wiley and Sons publisher, pp. 214-222.*
Wolff, Edward A., et al., Microwave Engineering and Systems Applications, pp. 214-222, 1988.

* cited by examiner

Primary Examiner—Sanh D. Phu
(74) Attorney, Agent, or Firm—Harrington & Smith, PC

(57) ABSTRACT

A transceiver is provided that includes a TX path mixer that up converts, a RX path mixer that down converts, and a local oscillator that provides a mixing frequency for the TX and RX mixers. The transceiver further provides a directional coupler having an input path coupled to the input of a UHF VCO for dividing power to a TX path and a RX path in the directional coupler. A mixer is provided to mix the input/output frequencies from the RX IF/TX IF. The operating frequency range of the directional coupler is greater than the output frequency of the UHF VCO. The directional coupler splits the UHF VCO unequal power at different ports of the directional coupler to redistribute the power in different ports, thus preventing the TX signal from being reflected back to the RX signal. The invention further provides the additional isolation required by the TX local oscillator chain by preventing reverse power feed into the RX local oscillator. The invention additionally provides for a reduced component count thereby providing savings in cost, complexity, size and power consumption.

34 Claims, 5 Drawing Sheets

DIRECTIONAL COUPLER FOR USE IN VCO UNEQUAL POWER SPLITTING

TECHNICAL FIELD

This invention relates generally to wireless communications systems and, more specifically, relates to directional couplers for the radio frequency (RF) synthesizer field, such as RF synthesizers for cellular mobile communication devices.

BACKGROUND

In radios using the superheterodyne principle, all signal frequencies are typically converted to a constant lower frequency before detection. This constant frequency is called the Intermediate Frequency, or IF. Superheterodyne receivers "heterodyne" a frequency from a local oscillator (within the receiver) with the incoming signal. That is, they generate new frequencies by mixing two or more signals in a nonlinear device. A superheterodyne receiver converts any selected incoming frequency by heterodyne action to a common intermediate frequency where amplification and selectivity (filtering) are provided.

In the receiver of a mobile terminal the local oscillator signal is mixed in the receiver mixer with the received signal in order to generate the intermediate frequency signals. For an RF wireless application, a transmitter and receiver require a synthesizer to up convert and down convert modulated and received signals In synthesizer design, various frequencies are combined to produce an intermediate frequency. The IF is the frequency to which all selected signals are converted for additional amplification, filtering and eventual direction. However, the combining of various frequencies often results in spurious signals. These spurs are unwanted signals produced by an active microwave component, usually at a frequency unrelated to the desired signal or its harmonics.

A frequency synthesizer generates any of a range of frequencies from a single fixed timebase or oscillator. Frequency synthesizers are used to generate the local oscillator signals required to perform the down conversion in the receiver and the up conversion in the transmitter. Frequency synthesizers generate multiple channels from a single master crystal oscillator, and can generate hundreds of frequencies.

Wireless communication systems typically require frequency synthesis in both the receive path and the transmit path.

Phase-locked loop (PLL) circuits including voltage controlled oscillators (VCOs) are often used in mobile terminal applications to produce the desired output frequency. Almost all modern synthesizers operate on the principle of the phase locked loop. Other systems exist, based on mixing, or on a combination of mixing and PLL designs. The frequency synthesizer compares the frequencies of two signals and produces an error signal which is proportional to the difference between the input frequencies. The error signal is used to drive a voltage controlled oscillator which creates an output frequency. The output frequency is fed through a frequency divider back to the input of the system, producing a negative feedback loop. If the output frequency drifts, the error signal will increase, driving the frequency in the opposite direction so as to reduce the error. Thus the output is locked to the frequency at the other input. This input is called the reference and is derived from a crystal oscillator. The key to the ability of a frequency synthesizer to generate multiple frequencies is that the divider is placed between the output and the feedback input.

A conventional directional coupler is shown in FIG. 1. A directional coupler couples part of the transmission power by a known amount out through another port, often by using two transmission lines set close enough together such that energy passing through one is coupled to the other. As shown in FIG. 1, a directional coupler generally has four ports: an input port ($P_1$), a transmitted port ($P_2$), where generally one half of the input signal is directed), a coupled port ($P_3$), where one half of the input signal is directed, and an isolated port ($P_4$) where no signal is directed. Often the isolated port is terminated with an internal or external matched load. It should be pointed out that since the directional coupler is a linear device any port can be the input. The term "main line" or "main path" refers to the section between ports 1 and 2. Moreover, the signals coming out from Ports 2 and 3 are 90 degrees out of phase with each other.

Reference can be made to, for example, commonly assigned U.S. Pat. No. 6,215,988, entitled "Dual-Band Architectures for Mobile Stations", by Jorma Matero, for showing the conventional use of directional couplers for detecting the output TX power in part of a closed loop TX power control system.

Traditional superheterodyne transceivers have required the output of the VCO to down/up convert signals using mixers. This requirement means that the VCO signals must be divided into two paths to perform the up/down conversion.

Conventional methods for power division have included designs using either three resistors in a resistive divider configuration or a Wilkinson power divider type configuration. These conventional methods have their own advantages and disadvantages, but one common feature is that the power division to the RX and TX mixers is equal. In addition, these conventional techniques for VCO power division required a significant number of components, including an additional amplifier acting as a buffer in the up conversion path to provide high isolation from the up converter to the down converter, resulting in large current requirements and power consumption. Minimizing battery power consumption is a priority in wireless communications devices, as well as minimizing the physical size of the device.

SUMMARY OF THE PREFERRED EMBODIMENTS

The foregoing and other problems are overcome, and other advantages are realized, in accordance with the presently preferred embodiments of these teachings.

In one aspect this invention provides a method for constructing and operating a dual band wireless user terminal, such as a personal communicator or a cellular telephone, so as to reduce the component count to achieve savings in cost, complexity, size, and power consumption.

In another aspect, the invention provides for improved talk time and standby time by reducing the components of the VCO by unequally splitting current from the VCO between the RX and TX mixers, while maintaining the high isolation performance between the transmit and receive path. Preferably, a directional coupler is used to perform this unequal VCO output power splitting, providing the required isolation on both the TX and RX ports, thus reducing current requirements and power consumption.

In another aspect, the invention provides a transceiver that includes a TX path mixer that up converts a signal to be transmitted, a RX path mixer that down converts a received signal, and a local oscillator having an output providing a mixing frequency for each of the TX and RX mixers. The transceiver also includes a directional coupler that includes an input node coupled to an output of a local oscillator that also includes an output node coupled to the TX path mixer and another output node coupled to an RX path mixer.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
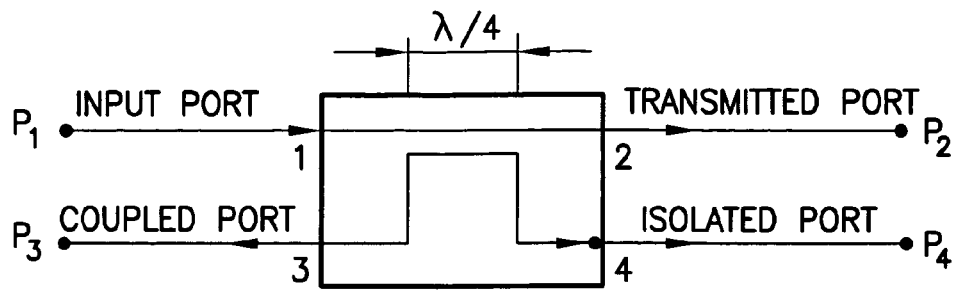
FIG. 1 is a block diagram of a conventional directional coupler.
Figure 2:
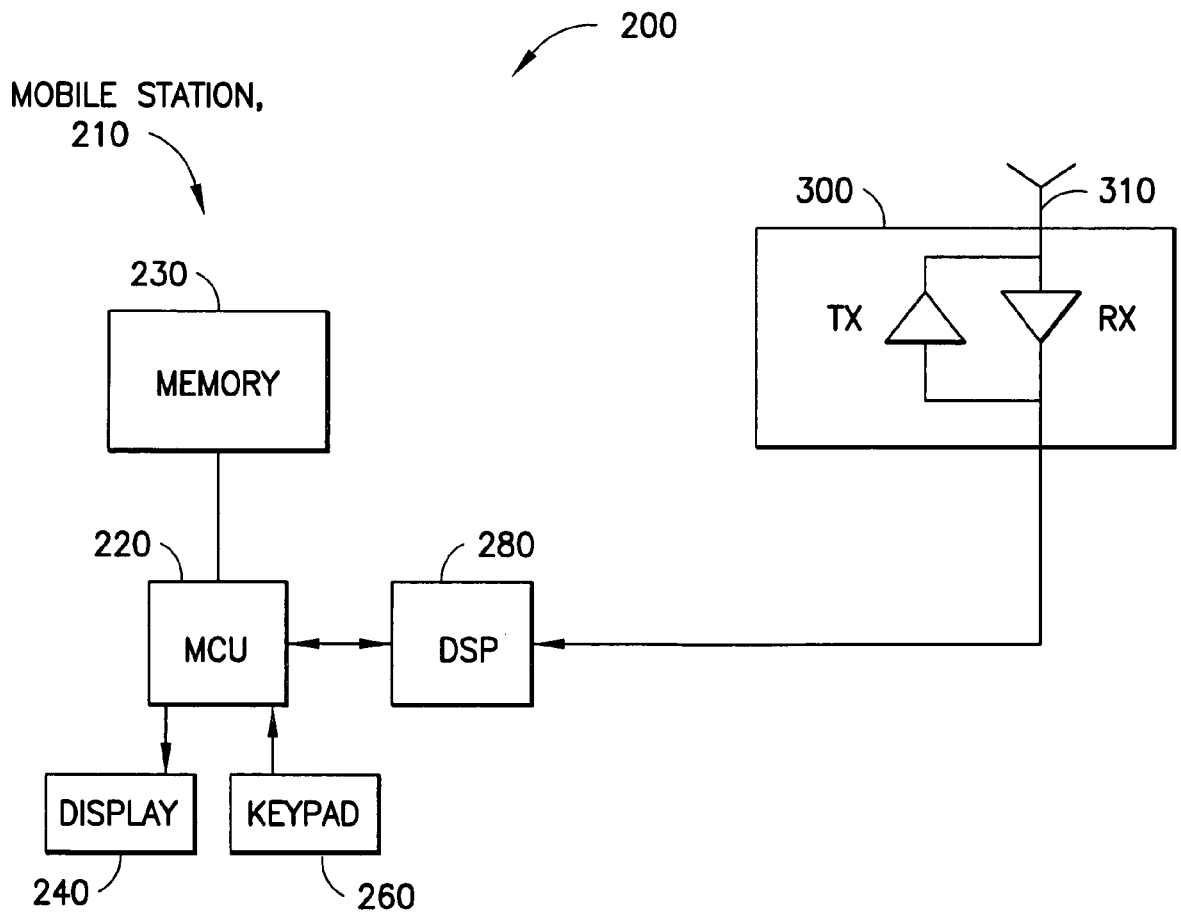
FIG. 2 is a simplified block diagram of an embodiment of a mobile station that is suitable for practicing this invention.

By way of introduction, and referring to FIG. 2, there is shown as a simplified block diagram an embodiment of a mobile terminal 210, also referred to herein as a mobile station, such as a cellular telephone, a PDA or other handheld platform having wireless communication capabilities. The mobile terminal 210 typically includes a control unit or control logic, such as a micro-control unit (MCU) 220 having an output coupled to an input of a display 240 and an input coupled to an output of a keyboard or keypad 260. Although not shown, a microphone and speaker may be provided for enabling the user to conduct voice calls in a conventional manner.

The MCU 220 is assumed to include or be coupled to some type of a memory 230, a non-volatile memory for storing an operating program and other information, as well as a volatile memory for temporarily storing required data, scratchpad memory, received packet data, packet data to be transmitted, and the like.

The mobile terminal 210 also contains a wireless section that includes a digital signal processor (DSP) 280, or equivalent high speed processor or logic, as well as a wireless transceiver 300 that includes a transmitter and a receiver, both of which are coupled to an antenna 310 for communication with a wireless network. Data, such as digitized voice and packet data, is transmitted and received through the antenna 310.

Wireless phones most commonly operate in the cellular band (transmit frequency 824-849 MHz, receive frequency 869-894 MHz) and the Personal Communication System (PCS) band (transmit frequency 1850-1910 MHz, receiver frequency 1930-1990 MHz). A single wireless communications device can be designed to operate in both the cellular and the PCS bands.

Figure 3:
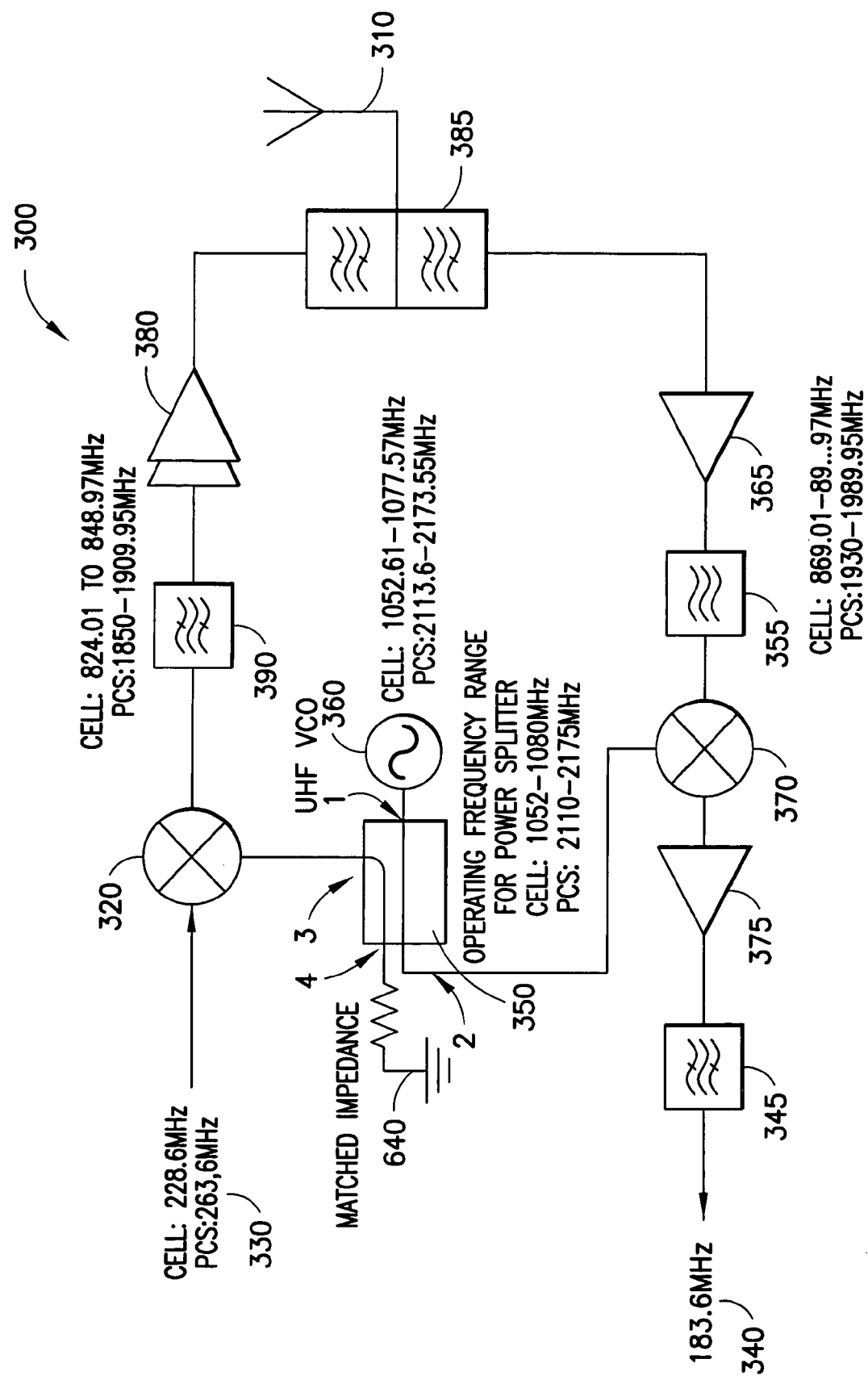
FIG. 3 is a block diagram that shows an enlarged view of the transceiver of the mobile station including a directional coupler according to the present invention.
Figure 6:
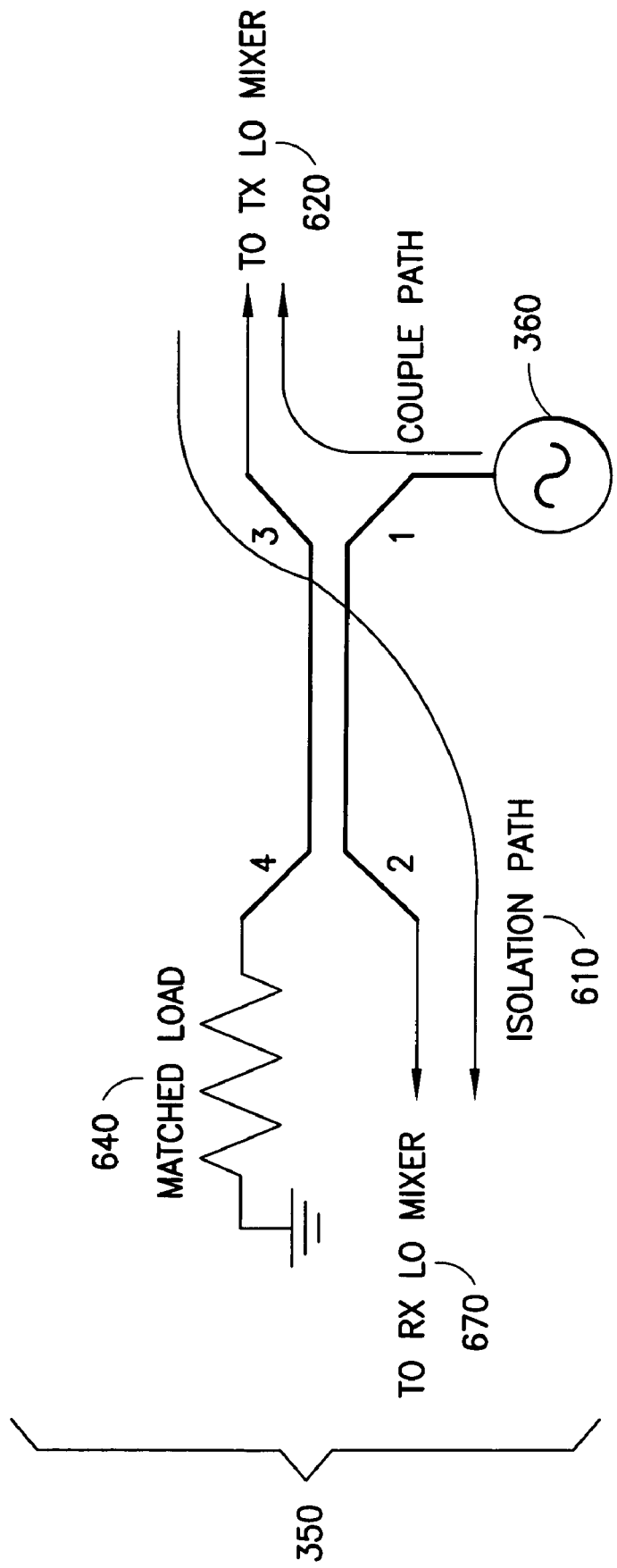
FIG. 6 is a block diagram showing the isolation path from the transmit path in the directional coupler.

The frequency plan of the present invention uses one intermediate frequency (IF) to cover both the cellular and the PCS bands. FIG. 3 shows a block diagram of a superheterodyne transceiver utilizing a dual band directional coupler 350 coupled to the input of a UHF VCO 360 according to the present invention. The transceiver uses a mixer 320/370 to mix the input/output frequencies from the RX IF/TX IF 330/340. In order to cover two different bands, a dual band directional coupler is used 350. Referring also to FIG. 6, a close up view of the directional coupler 350 is shown. The coupler input port (port 1) is coupled to the RX LO Mixer (port 2), while the TX LO mixer port (port 3) is coupled to the impedance port (port 4). FIG. 3 also shows the TX mixer 320 which sends a signal to a bandpass filter 390, which is amplified by a power amplifier 380. The received signal from the antenna 310 is routed through a duplexer 385. A low noise amplifier (LNA) 365 increases the level of the weak incoming RF signal without significantly degrading the signal-to-noise ratio (SNR). The LNA 365 output signal is routed through a bandpass filter 355 that provides additional attenuation. The received RF signals are then routed to a mixer 370 where they are down converted to a common IF. The IF signal is then applied to the input of a buffer amplifier 375 which provides the final downconversion to the last IF where it is split and fed into a band pass filter 345.

As shown in FIG. 3, the operating frequency range of the dual band directional coupler 350 is 1052-1080 MHz for the cellular band and 2110-2175 MHz for the PCS band. The operating frequency range of the UHF VCO 360 is 1052.61-1077.57 for the cellular band and 2113.6-2173.55 MHz for the PCS band. Thus it can be seen that the operating frequency range of the dual band directional coupler 350 is greater than the output frequency of the UHF VCO 360. Indirectly, the dual band directional coupler 350 also acts as a low pass filter to suppress second or higher harmonics which are generated from the UHF VCO 360 source. A clean content local oscillator reduces the spur in the transmitter and improves out of band spur rejection in the receiver.

Figure 4:
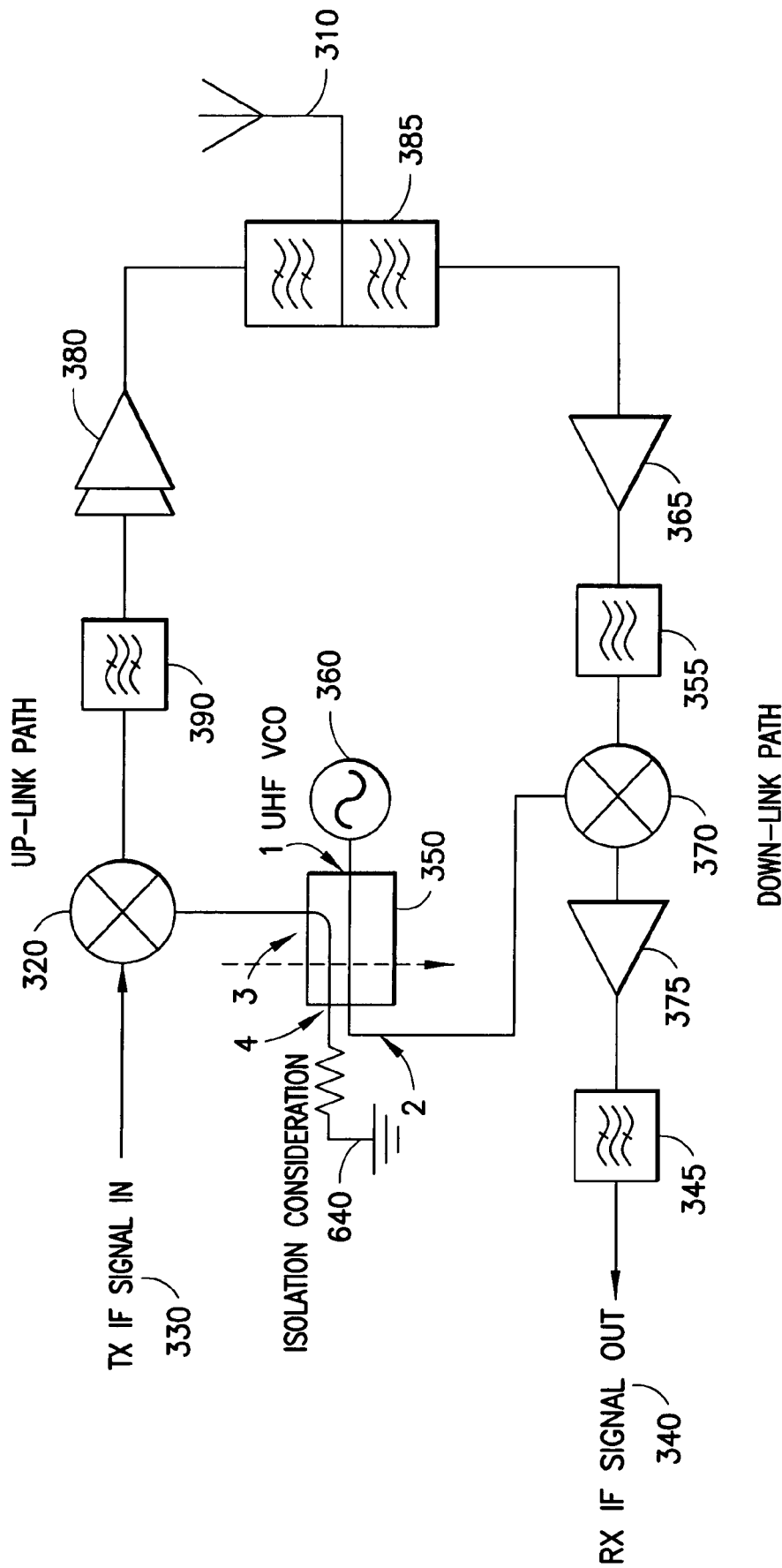
FIG. 4 is a block diagram configuration that uses the directional coupler according to the present invention, to divide the voltage controlled oscillator power.

FIG. 4 shows a block diagram configuration that utilizes the dual band directional coupler 350 to split the UHF VCO 360 power. As mentioned previously, traditional superheterodyne transceivers have required the VCO to down/up convert signals. This requirement meant that the VCO signals had to be split into two paths to perform the up/down conversion. As the TX local oscillator mixer 320 power requirement is different from the RX local oscillator mixer 370 power requirement, a technique is provided, according to the present invention, for different power splitting output requirements. This technique splits the unequal power at different ports of the directional coupler to redistribute the power in different ports.

High isolation is required from the TX port 330 to the RX port 340. The present invention provides for reduced loss in the main path, thereby realizing the higher input power requirement of the receiver local oscillator port. The invention covers dual band for dual band single output VCO configurations and achieves all port return loss requirements.

Figure 5:
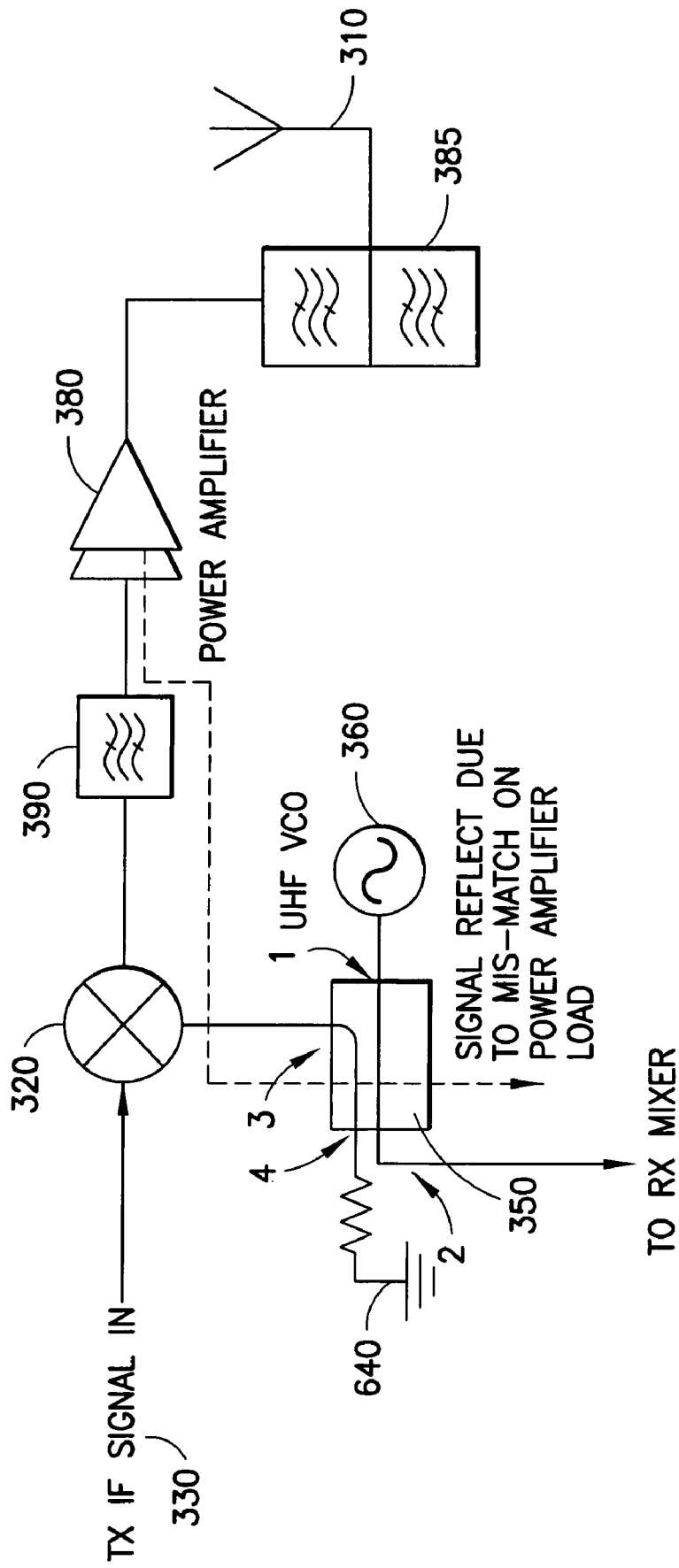
FIG. 5 is a block diagram showing the directional coupler, according to the present invention, acting as an isolator.

High isolation is a primary consideration in wireless communications devices. A feature of this invention is that it prevents the TX signal 330 from being reflected back to the RX signal 340, which would create single tone desensitization (STD) problems. In order to obtain the maximum output power, the output load from the power amplifier (PA) 380 is not an exact conjugate match to the PA 380 output impedance. This means that there will be some reflected power going back to the PA 380 input. Due to the high power output from the PA 380 (normally 30 dBm) the reverse isolation of the PA 380, RF filter 390 and mixer isolation is not sufficient to prevent this problem and additional isolation is necessary for the TX local oscillator chain. FIG. 5 shows that the dual band directional coupler 350, according to the present invention, provides the additional isolation required by the TX local oscillator chain by preventing reverse power from feeding into the RX local oscillator, thus reducing the possibility of single tone desensitization problems.

The main path insertion loss is also reduced, thereby providing higher output power for the RX RF mixer 370. Based on the characteristics of directional couplers, the main path normally has less loss due to loss in the directional couplers strip line, while a small amount of power is coupled to the coupler input port (port 1). The coupling loss for the coupler 350 is determinable as the input power requirements on the TX local oscillator port are much less than on the RX local oscillator port. The input power requirement on the up converter is about −7 dBm to −13 dBm, while the UHF VCO 360 output power range is between 3 dBM to −3 dBm. In order to meet these specifications, the dual band directional coupler 350 loss is less than or equal to 10 dB, while the hard limit for the RX LO port is −7 dBm. The results of these calculations show that the main path losses are less than 4 dB.

Port 4 of the coupler 350 is terminated with a 50 ohm load which provides and absorbs all of the reverse power achieving the high isolation requirement. Normally, providing 15 to 20 dB isolation from the coupler port (port 4) to the main input port (port 1) is easily achieved. The isolation is dependent upon the matched impedance in the terminated port. These advantages are ideally matched to the application on dividing the VCO power to up/down converter.

Referring again to FIG. 6, at the isolation path 610 the dual band directional coupler 350 provides high reverse isolation from the TX path 620. The principle is that the reflected signal from the TX port will be absorbed by the matched load 640. Therefore, less power will couple back to the RX port 670. The matched load 640 provides a perfect match between the coupler 350 and the load 640. Ideally no power is reflected back from port 4, and coupled back to port 2. The isolation is dependent on the matching load impedance 640 at port 4.

The isolation is defined by the power ratio from port 3 to port 2, and is preferably about 13 db. The coupling factor is defined by the power ratio from port 1 to port 3. The coupling factor for the cell band is preferably about 8.4 db and the coupling factor for the PCS band is preferably about 6.4 db.

The invention can be implemented during the process of IC fabrication. The coupler 350 operates, in a presently preferred embodiment, in both the 800 MHz cellular band and the 1900 MHz PCS band. In order to accommodate the larger 800 MHz wavelength of the cellular band, the coupler 350 is implemented using a strip line. As the dielectric constant on printed circuit boards (PCB) is small, it is challenging to realize the isolation specification, but by using multilayer technology on ceramic, the signal quality and size requirements of the coupler 350 can be achieved. In one preferred, but non-limiting embodiment, the size of the coupler 350 is 3.2(L) by 1.6(W) by 0.9(H) mm.

The use of the techniques disclosed above have been found to enable a reduction in the number of components required when constructing transceivers for wireless communications devices, thereby providing savings in cost, complexity, size and power consumption. The use of these techniques also overcomes the problems presented by prior art approaches, such as eliminating the requirement to use separate directional couplers for TX and RX signals.

Although described in terms of preferred embodiments, it should be realized that a number of modifications of the teachings of this invention may occur to one skilled in the art and will still fall within the scope of this invention. By example, the teachings of this invention are not limited to only those frequency bands described herein. Further, while the teachings of this invention described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof.

What is claimed is:

1. A transceiver, comprising:
   a TX path mixer that up converts a signal to be transmitted, a RX path mixer that down converts a received signal, and a local oscillator having an output providing a mixing frequency for each of said TX and RX mixers;
   further comprising a directional coupler comprising an input node coupled to said output of said local oscillator and further comprising a first output node coupled to said TX path mixer and a second output node coupled to said RX path mixer, the directional coupler further comprising an isolation node, wherein an impedance terminating the isolation node is different from a load impedance of the first output node.

2. A transceiver as in claim 1, wherein the directional coupler acts as an unequal power divider.

3. A transceiver as in claim 1, wherein the directional coupler prevents a TX signal from being reflected back on a RX signal.

4. A transceiver as in claim 1, wherein the directional coupler operating frequency range is greater than the output frequency of the local oscillator.

5. A transceiver as in claim 1, wherein the directional coupler provides an isolation path from the TX path mixer to the RX path mixer.

6. A transceiver as in claim 1, wherein the directional coupler covers dual bands for dual band single output local oscillator configurations.

7. A transceiver as in claim 1, wherein the directional coupler prevents single tone desensitization.

8. A transceiver as in claim 1, wherein the directional coupler provides higher output power for the RX path mixer.

9. A transceiver as in claim 1, wherein the directional coupler loss is less than 10 dB.

10. A transceiver as in claim 1, wherein the impedance terminating the isolation node comprises a 50 ohm load to absorb reverse power.

11. A transceiver as in claim 1, wherein an isolation path of the directional coupler provides high reverse isolation from a TX path.

12. A method for generating transceiver signals, comprising:
   up converting a signal to be transmitted via a TX path mixer, down converting a received signal via a RX path mixer,
   providing a local oscillator having an output providing a mixing frequency for each of said TX and RX mixers;
   coupling the output of said local oscillator to an input node of a directional coupler, and coupling said TX path mixer to a first output node of said directional coupler and coupling said RX path mixer to a second output node of said directional coupler, the directional coupler further comprising an isolation node, wherein an impedance terminating the isolation node is different from a load impedance of the first output node.

13. A method as in claim 12, wherein the directional coupler acts as an unequal power divider.

14. A method as in claim 12, wherein the directional coupler prevents a TX signal from being reflected back on a RX signal.

15. A method as in claim 12, wherein the directional coupler provides higher output power for the RX path mixer.

16. A method as in claim 12, wherein the directional coupler provides an isolation path from the TX path mixer to the RX path mixer.

17. A method as in claim 12, wherein an isolation path of the directional coupler provides high reverse isolation from a TX path.

18. A device, comprising:
a radio frequency transceiver comprising:
a TX path mixer that up converts a signal to be transmitted; a RX path mixer that down converts a received signal; a local oscillator having an output providing a mixing frequency for each of said TX and RX mixers; and a directional coupler comprising an input node coupled to said output of said local oscillator and further comprising a first output node coupled to said TX path mixer and a second output node coupled to said RX path mixer, the directional coupler further comprising an isolation node, wherein an impedance terminating the isolation node is different from a load impedance of the first output node.

19. A device according to claim 18, wherein the directional coupler is a multi band directional coupler.

20. A device according to claim 18, further comprising a TX power amplifier for receiving the upconverted signal from the TX path mixer, wherein an output load from the TX power amplifier is not an exact conjugate match to the TX power amplifier output impedance.

21. A device according to claim 18, wherein a TX signal is prevented from being reflected back to a RX signal.

22. A device according to claim 18, wherein the directional coupler is configured to operate in multiple bands.

23. A device according to claim 18, wherein the device comprises a mobile terminal.

24. A device according to claim 18, wherein the device comprises a cellular mobile communication device.

25. A circuit comprising:
a TX path mixer that up converts a signal to be transmitted;
a RX path mixer that down converts a received signal;
a local oscillator having an output providing a mixing frequency for each of said TX and RX mixers; and
a directional coupler comprising an input node coupled to said output of said local oscillator and further comprising a first output node coupled to said TX path mixer and a second output node coupled to said RX path mixer, the directional coupler further comprising an isolation node and an amplifier coupled to the TX path mixer, the isolation node being electrically connected to circuit ground through an impedance that is substantially matched to an output load impedance of the amplifier coupled to the TX path mixer.

26. A circuit according to claim 25, wherein the isolation node impedance is not exactly matched to the output load impedance of the TX path mixer amplifier.

27. A circuit according to claim 25, wherein the directional coupler acts as an unequal power divider.

28. A circuit according to claim 25, wherein the directional coupler prevents a TX signal from being reflected back on a RX signal.

29. A circuit according to claim 25, wherein the directional coupler operating frequency range is greater than the output frequency of the local oscillator.

30. A circuit according to claim 25, wherein the directional coupler provides an isolation path from the TX path mixer to the RX path mixer.

31. A circuit according to claim 25, wherein the directional coupler is operable over a plurality of frequency bands for multi band single output local oscillator configurations.

32. A circuit according to claim 25, wherein the circuit is embodied in an integrated circuit.

33. A device comprising:
first means for mixing a first signal with a mixing frequency to up convert the first signal for transmission;
second means for mixing a second signal with the mixing frequency to down convert the second signal that has been received; and
means for generating the mixing frequency; and
means for coupling the mixing frequency to said first and second mixing means, said coupling means providing isolated paths for providing the mixing frequency to the first and second mixing means, the means for coupling further comprising an isolation node and an amplifier coupled to the first means for mixing a first signal, the isolation node being electrically connected to circuit ground through an impedance that is substantially matched to an output load impedance of the amplifier coupled to the first means for mixing a first signal.

34. A device according to claim 33, wherein the coupling means prevent a signal from being reflected from said first means for mixing to said second means for mixing.

* * * * *